(12) United States Patent
Williams et al.

(10) Patent No.: US 9,483,759 B2
(45) Date of Patent: *Nov. 1, 2016

(54) SYSTEM AND METHOD FOR PAIRING A BLUETOOTH DEVICE WITH A POINT-OF-SALE TERMINAL

(71) Applicant: Gilbarco Inc., Greensboro, NC (US)

(72) Inventors: Rodger K. Williams, Siler City, NC (US); Edward A. Payne, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,094

(22) Filed: May 15, 2015

(65) Prior Publication Data
US 2015/0248666 A1 Sep. 3, 2015

Related U.S. Application Data

(63) Continuation of application No. 13/729,411, filed on Dec. 28, 2012, now Pat. No. 9,033,217, which is a continuation of application No. 12/505,006, filed on Jul. 17, 2009, now Pat. No. 8,342,407.

(60) Provisional application No. 61/082,342, filed on Jul. 21, 2008.

(51) Int. Cl.
*G06K 19/00* (2006.01)
*G06Q 20/32* (2012.01)
(Continued)

(52) U.S. Cl.
CPC ........ *G06Q 20/3276* (2013.01); *G06Q 20/202* (2013.01); *G06Q 20/32* (2013.01); *G06Q 20/3226* (2013.01); *G06Q 20/3274* (2013.01);

(Continued)

(58) Field of Classification Search
USPC .................. 235/435, 439, 454, 462
See application file for complete search history.

(56) References Cited

U.S. PATENT DOCUMENTS

| | | |
|---|---|---|
| 6,535,726 B1 | 3/2003 | Johnson |
| 7,039,389 B2 | 5/2006 | Johnson, Jr. |

(Continued)

OTHER PUBLICATIONS

Marketwire article entitled "Retailers to Send up to 3 Billion 'Mobile Coupons' to Phone Users by 2011, According to Juniper Research" dated Apr. 23, 2008, http://www.marketwire.com/press-release (last accessed Aug. 30, 2012).

*Primary Examiner* — Matthew Mikels
(74) *Attorney, Agent, or Firm* — Nelson Mullins Riley & Scarborough, LLP

(57) ABSTRACT

A method of completing a transaction at a point-of-sale terminal using payment information contained on a wireless unit of a customer. The method comprises providing a point-of-sale terminal capable of wirelessly connecting with a wireless unit of a customer desiring to complete a transaction. The point-of-sale terminal is used to perform at least one of reading a barcode displayed on the wireless unit containing short range network pairing information, or displaying a barcode containing short range network pairing information for reading by the wireless unit, to thereby establish a short range wireless network between the point-of-sale terminal and the wireless unit of the customer. Via the short range wireless network, transaction data is received from the wireless unit of the customer containing payment information. The transaction data is then used to effect payment for the transaction and thereby complete the transaction.

11 Claims, 3 Drawing Sheets

(51) Int. Cl.
    *G06Q 90/00*     (2006.01)
    *G06Q 20/20*     (2012.01)
    *G07G 1/00*     (2006.01)
    *G07G 1/12*     (2006.01)

(52) U.S. Cl.
    CPC ............ *G06Q 90/00* (2013.01); *G07G 1/0036* (2013.01); *G07G 1/12* (2013.01)

(56) References Cited

U.S. PATENT DOCUMENTS

| | | |
|---|---|---|
| 7,156,306 B1 | 1/2007 | Kenney |
| 7,289,877 B2 | 10/2007 | Wilson |
| 7,574,377 B2 | 8/2009 | Carapelli |
| 7,664,885 B2 | 2/2010 | Carapelli |
| 8,146,802 B1 | 4/2012 | Ramachandran et al. |
| 8,205,791 B2 | 6/2012 | Randazza et al. |
| 8,342,407 B2 * | 1/2013 | Williams ............... G06Q 20/32 235/462.01 |
| 9,033,217 B2 * | 5/2015 | Williams ............... G06Q 20/32 235/375 |
| 2002/0023027 A1 | 2/2002 | Simonds |
| 2002/0190128 A1 * | 12/2002 | Levine ............... G06K 17/0022 235/462.13 |
| 2004/0253923 A1 | 12/2004 | Braley et al. |
| 2005/0125301 A1 | 6/2005 | Muni |
| 2006/0075075 A1 | 4/2006 | Malinen et al. |
| 2006/0135064 A1 * | 6/2006 | Cho .................... H04M 1/7253 455/41.1 |
| 2006/0255149 A1 | 11/2006 | Retter et al. |
| 2008/0235105 A1 * | 9/2008 | Payne .................... G06Q 20/40 705/27.1 |
| 2010/0325003 A1 | 12/2010 | Ringeman et al. |
| 2012/0072350 A1 | 3/2012 | Goldthwaite et al. |

\* cited by examiner

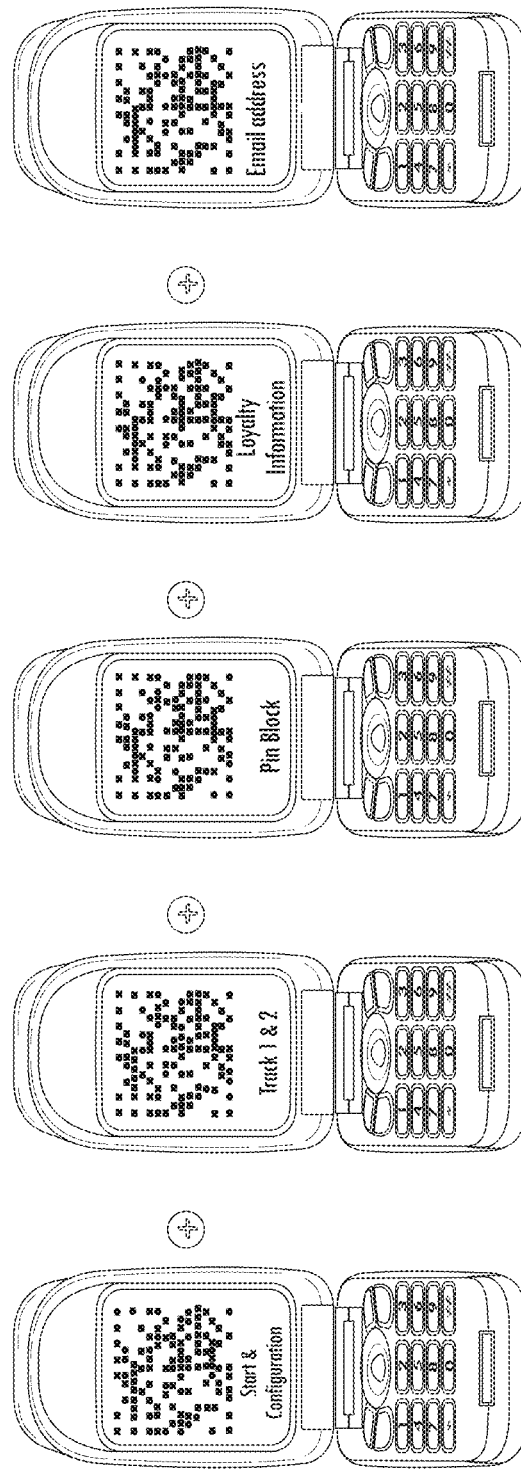

SYSTEM AND METHOD FOR PAIRING A BLUETOOTH DEVICE WITH A POINT-OF-SALE TERMINAL

CROSS-REFERENCE TO RELATED APPLICATION

The present application is a continuation of U.S. application Ser. No. 13/729,411, filed Dec. 28, 2011, now pending; which is a continuation of U.S. application Ser. No. 12/505,006, filed Jul. 17, 2009, now patented as U.S. Pat. No. 8,342,407, granted on Jan. 1, 2013; which claims priority to U.S. provisional application Ser. No. 61/082,342, filed Jul. 21, 2008. The aforementioned patent applications are incorporated by reference herein in their entireties.

FIELD OF THE INVENTION

The present invention relates to systems and methods for wireless connecting devices and, more particularly, to systems and methods for pairing a hand held device equipped with BLUETOOTH wireless networking capability to a point-of-sale terminal.

BACKGROUND OF THE INVENTION

In the past, in order to perform a transaction at a point-of-sale terminal, the customer physically touched a point-of-sale terminal. This only allows a single customer to be served at a point-of-sale terminal.

Most everyone today carries a hand held wireless device, such as a cell phone with them. The latest generation of cell phones are equipped with low-power wireless communication devices, such as systems utilizing the wireless networking standard known as BLUETOOTH, which enable the cell phone to communicate over short distances, for example, 10 meters, with other similarly equipped electronic devices. However, to establish a BLUETOOTH wireless connection with a point-of-sale terminal, the customer must physically enter pair information data to make a secure connection.

SUMMARY OF THE INVENTION

The present invention recognizes and addresses disadvantages of prior art constructions and methods, and it is an object of the present invention to provide an improved display system. This and other objects may be achieved by a method of connecting a wireless unit to a point-of-sale terminal, the method comprising providing a wireless unit having a display and image reader, said display being configured to display a barcode and said image reader being configured to read a barcode and providing a point-of-sale terminal to wirelessly connect to said wireless unit, said point-of-sale terminal having a display configured to display a barcode, and an image reader configured to read a barcode. The method further comprises the steps of displaying a first barcode on one of said wireless unit display and said point-of-sale terminal display, said first barcode containing information necessary to pair the wireless unit with the point-of-sale terminal, reading said displayed first barcode with said image reader of the other one of said wireless unit and said point-of-sale terminal, decoding said reader first barcode to extract data from said first barcode, and wirelessly connecting said wireless unit to said point-of-sale terminal based on said extracted data.

In some embodiments, said first barcode contains an address and a personal identification number associated with said address. In other embodiments, said first barcode is displayed for a fixed period of time. In yet other embodiments, said wireless unit is a cell phone.

In still other embodiments, the method further comprises the step of generating a second barcode by said other of said wireless unit and said point-of-sale terminal and displaying said second barcode on said other of said wireless unit and said point-of-sale terminal display. In this embodiment, the method further comprises the steps of decoding said second barcode and storing said decoded data in a memory storage of said one of said wireless unit and said point-of-sale terminal. In other embodiments, said second barcode contains data representative of at least one of said other of said wireless unit and said point-of-sale terminal address and personal identification number. In still other embodiments, said wireless unit display and image reader are integrated in a single bi-directional screen capable of displaying and receiving optical images.

In another preferred embodiment, a method of connecting a wireless unit to a point-of-sale terminal comprises providing a wireless unit having a display and image reader, and providing a point-of-sale terminal to wirelessly connect to said wireless unit, said point-of-sale terminal having a display and an image reader. The method further comprises the steps of displaying a first barcode on one of said wireless unit display and said point-of-sale terminal, said first barcode containing information necessary to pair the wireless unit with the point-of-sale terminal, reading said displayed first barcode with said image reader of the other of said wireless unit and said point-of-sale terminal, displaying a second barcode on said other of said wireless unit and said point-of-sale terminal in response to said first barcode, reading said displayed second barcode with said image reader of said one of said wireless unit and said point-of-sale terminal and wirelessly pairing said wireless unit to said point-of-sale terminal based on said first and said second barcode data.

In some embodiments, said first barcode contains an address and a personal identification number associated with said address. In other embodiments, said second barcode contains an address and personal identification number of said other of said wireless unit and said point-of-sale terminal. In still other embodiments, said first barcode further comprises a public/private key system to prevent data theft.

In some embodiments, said point-of-sale terminal is a fuel dispenser. In yet other embodiments, said wireless unit is a cell phone.

In yet another preferred embodiment, a method of connecting a wireless unit to a point-of-sale terminal comprises providing a wireless unit having a display and image reader and providing a point-of-sale terminal to wirelessly connect to said wireless unit, said point-of-sale terminal having a display and an image reader. The method further comprises displaying a first barcode on one of said wireless unit and said point-of-sale terminal, said first barcode containing at least one of an address and a personal identification number for said one of said wireless unit and said point-of-sale terminal, reading said displayed first barcode by said other of said wireless unit and said point-of-sale terminal, displaying a second barcode by said other of said wireless unit and said point-of-sale terminal, said second barcode containing at least one of an address and a personal identification number for said other of said wireless unit and said point-of-sale terminal, reading said displayed second barcode by said other of said wireless unit and said point-of-sale terminal, and wirelessly connecting said wireless unit to said point-of-sale terminal based on said first and said second barcode data.

In some embodiments, the method further comprises the step of wirelessly transmitting transaction data from said point-of-sale terminal to said wireless unit. In these embodiments, the method further comprises the step of completing said transaction on said wireless unit. In still other embodiments, the method further comprises the step of initiating payment for said transaction on said wireless unit. In yet other embodiments, said point-of-sale terminal is a fuel dispenser. In other embodiments, said wireless unit is a cell phone.

Various combinations and sub-combinations of the disclosed elements, as well as methods of utilizing same, which are discussed in detail below, provide other objects, features and aspects of the present invention.

The accompanying drawings, which are incorporated in and constitute a part of this specification, illustrate one or more embodiments of stacked displays of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 1 is a perspective view of a coded image for use in an embodiment of the present invention;

FIG. 2 is a perspective view of a coded image for use in an embodiment of the present invention;

FIG. 3 is a perspective view of a coded image for use in an embodiment of the present invention;

FIG. 4 is a perspective view of a coded image for use in an embodiment of the present invention;

FIG. 5 is a perspective view of a coded image for use in an embodiment of the present invention;

Figure 6:
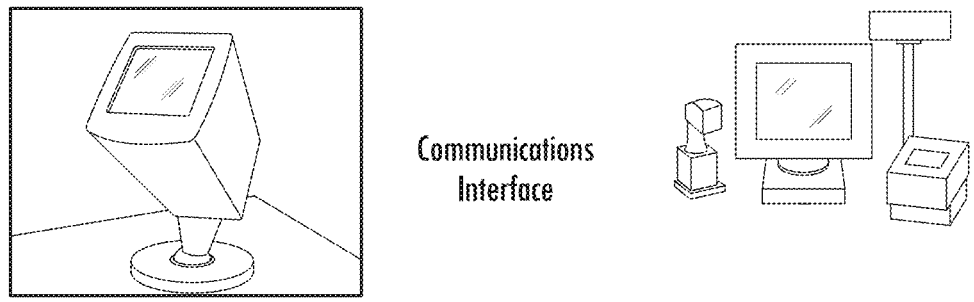
FIG. 6 is a mobile module for use with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations. Additional aspects and advantages of the invention will be set forth in part in the description which follows and, in part, will be obvious from the description, or may be learned by practice of the invention.

In a new and improved system, referring to FIGS. 1-5, a cell phone is used to encode credit/debit or other payment information for a customer transaction, or encode wireless pairing information, for example a device address and PIN number for establishing a wireless connection between the handheld device and another device. A fuel dispenser point-of-sale (POS) terminal, either dedicated per dispenser side, per dispenser, proximate to and/or centralized remote, is equipped with a scanner (CCD or other image capture device), in addition to the normal readers (such as magnetic card readers, RFID readers, finger print readers, laser barcode readers, etc). The encoded information is displayed as one or more encrypted or non-encrypted images that may be locally stored on and generated by the cell phone. In other embodiments, the information may be remotely stored, transmitted over the cell phone network and displayed on the cell phone LCD. The encoded information includes, but is not limited to, a credit/debit card number, PIN information, GPS information, date/time information, handheld device information (wireless device address and PIN) or any other information necessary to complete a transaction. As a result, the image(s) are equivalent to a packet of information necessary to conduct a transaction at various types of POS terminals, such as a convenience store POS, fuel dispenser, etc. It should be understood that the image data may contain any encoded information necessary to carry various types of transactions, or the data may be used to initiate a wireless connection between the handheld device and the POS terminal.

When a transaction is initiated, the customer selects the payment method associated with the scanner, runs a program on their cell phone that generates at least one encoded image with the customer's payment information, and places the cell phone LCD adjacent the image scanner By placing the cell phone LCD adjacent the image scanner, the POS terminal can capture and decipher the image(s) to extract payment and other information. In other embodiments, the POS terminal may extract pairing information to establish a high-speed wireless connection between the cell phone and POS terminal.

In one embodiment and referring to FIG. 1, a start and configuration image is generated. Next at FIG. 2, card information normally contained in one or more tracks of a magnetic strip on a credit card is generated and displayed. Referring to FIG. 3, an encrypted image containing the user's PIN is generated and displayed. In other embodiments and referring to FIG. 4, loyalty information including, but not limited to, a loyalty code may be encoded and displayed. Finally, as shown in FIG. 5, the user's e-mail address may be encoded and displayed. The cell phone display may be configured to repeatedly display the images until a signal is sent from the POS indicating that the images have been received. In other embodiments, the images may be repeatedly displayed for a predetermined period of time. In yet other embodiments, the images may be repeated for a set number of times. In any event, the POS captures the encoded information from the images and processes the information as it would a credit/debit transaction.

It should be understood from the above that all information to complete a transaction may, in the alternative, be presented within a single static image frame. That is, if all information to complete a transaction can be encoded in a single image frame, then one image frame may be used to complete the transaction. The amount of data that can be placed in a single image frame is a function of the language being used, the encryption method, the size of the mobile device screen and the size of the reader. Thus, depending on the system and information needed to complete a transaction, one or more image frames may be used. Moreover, it should be understood that the order of the displayed images is not fixed, and is only limited by the parameters of the system being used. In other words, the final language should not presume fixed or finite image frame density, limit the invention to possible data structures, data content, force a particular data-to-frame assignment, or imply a specific order of sequencing of resultant frames. Conversely, nothing in this disclosure should preclude underutilization of image frames with respect to their potential data density, and thus inflation in the number of image frames for the purpose or convenience of segregating data type to individual dedicated frames.

In some embodiments, the security of a transaction can be increased by encoding information specific to the hand held device in the data transmitted to the mobile module or POS. For example, GPS information from the phone can be encoded with the payment information and transmitted to the mobile module. The received GPS information can be compared to GPS information contained within the mobile module to ensure that the data being generated by the customer's handheld device is fresh and is not a reproduction of images obtained during a transaction at another geographical location.

In yet other embodiments, the security of a transaction can be increased by encoding date and/or time information specific to the hand held device in the data transmitted to the mobile module or POS. For example, date and/or time information from the phone can be encoded with the payment information and transmitted to the mobile module. The received date/time can then be compared to date/time information contained within the mobile module to ensure that the data being generated by the customer's handheld device is fresh and is not a reproduction of images obtained during a transaction at another geographical location. In other embodiments, the mobile identification number of the handheld device may be transmitted with the payment information as a security measure.

In yet other embodiments, requesting secure data already encoded in real-time from a remote server can increase the uniqueness and/or security of a transaction. Also, data may be retrieved and stored for later use until such time that it has exceeded an expiration time/date or has exceeded a preset number of uses. For example, to provide uniqueness to the transaction, ten pin blocks may be requested and downloaded from a remote server to allow only 10 individual transactions in a given period of time. The retrieved data would then be discarded when the cell phone or other handheld device has utilized the ten transactions and/or the preset expiration date/time has been reached.

Referring to FIG. 6, one possible embodiment of an image reader is illustrated, that being a mobile module with a small package footprint. The embodiment may further contain other payment methodologies including, but not limited to, a BLUETOOTH wireless networking module, laser barcode reader for reading standard one or two-dimensional barcodes, near field communication (NFC), which is a two-way communication technology based on RFID, but it is sometimes called "contactless" technology used for "fast-lane" payment at gas stations and supermarkets, for transit payments, in conjunction with a uni-directional image receiver and/or a bi-directional screen capable of both displaying and receiving optical information. One example of a bi-directional screen is the new System LCD equipped with touch screen and scanner functions, manufactured by Sharp Corporation of Japan, which builds an optical sensor into each pixel of the LCD panel.

The mobile module may also contain a USB, serial connection or any other communications interface to transmit information to (or from) a local computer, server or central server. The mobile module may also be equipped with an AC power connector or other power source connector and/or cabling. The various internal interfaces allow the mobile module to communicate with or receive information from any handheld device having at least one of a camera, NFC, BLUETOOTH wireless networking system, a visual display such as a LCD, or other type of electrical, magnetic or visual communication device.

In one embodiment for connecting with a POS (FIG. 6), the mobile module can be mounted on a counter and connected into the POS terminal either through a USB connection, a serial port connection or any wireless method between the mobile module and the POS. The mobile module allows for one or more of uni-directional and bi-directional communication between the POS and a mobile device having at least one of the following communication mechanisms: NFC, BLUETOOTH wireless networking system, wi-fi, visual display such as a LCD and/or a camera. The amount of interaction over the mobile phone can range from the current NFC information required to complete a transaction to the other extreme where all transaction screens are displayed on the mobile device.

In a bi-directional embodiment of the present invention, the system may transmit coupon or product information to the customer's PDA or cell phone, while receiving payment information. In the alternative, by transmitting an e-mail address to the POS, the system may be configured to send information to the customer using the e-mail address. Moreover, if the system contains a loyalty program, loyalty points may be accumulated or coupons or other direct advertising may be sent to the e-mail address associated with the loyalty account.

Figure 7:
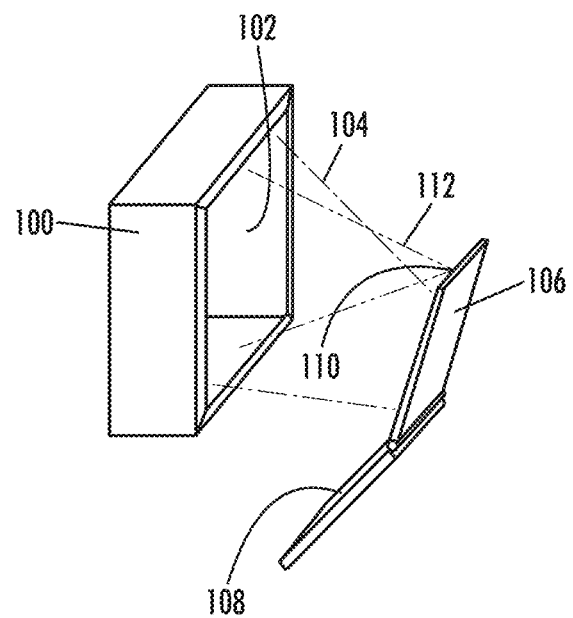
FIG. 7 is a mobile module and handheld device for use with an embodiment of the present invention.

In accordance with one embodiment of the present invention, mobile device 106 may be connected to mobile module 100 via a BLUETOOTH wireless networking connection. FIG. 7 illustrates a mobile module 100 and a handheld device 106. In particular, mobile module 100 has a display 102 containing a screen that allows for bi-directional transmission and receipt of images. In alternate embodiments, the display 102 may be a traditional LCD display and mobile module 100 may contain a separate camera located adjacent display 102. In either embodiment, mobile module 100 is capable of reading an image placed into the field of view 104 of the mobile module reader. Handheld device 106 may include a display (not shown) capable of displaying multiple coded images, similar to those shown in FIGS. 1-5, a camera or other image reader 110 and a keyboard or input device 108.

In some embodiments, images transmitted by the mobile module and handheld device may be used to establish (pair) a BLUETOOTH wireless networking connection between the handheld device and the mobile module. BLUETOOTH protocol is a networking standard that works at two levels: it provides agreement at the physical level, and it provides agreement at the protocol level, where products have to agree on when bits are sent, how many bits will be sent at a time, and how the parties in a conversation can be sure that the message received is the same as the message sent. BLUETOOTH networking transmits data via low-power radio waves, and communicates on a frequency in the band of 2.402 GHz and 2.480 GHz, which has been set aside by international agreement for the use of industrial, scientific and medical devices (ISM).

One of the ways BLUETOOTH wireless networking devices avoid interfering with other BLUETOOTH wireless networking systems and communication devices is by sending out very weak signals of about 1 milliwatt, which limits the range of a BLUETOOTH wireless networking device to about 10 meters, cutting the chances of interference between devices. Up to eight devices may be connected simultaneously through a BLUETOOTH wireless networking connection, and BLUETOOTH wireless networking uses spread-spectrum frequency hopping to significantly reduce the likelihood of more than one device transmitting on the same frequency at the same time as another device. The transmitters change frequencies 1,600 times every second so that more devices can make full use of the BLUETOOTH wireless networking radio spectrum.

When devices equipped with BLUETOOTH wireless networking come within range of one another, an electronic conversation takes place between the devices to determine whether they have data to share or whether one needs to control the other. The user doesn't have to press a button or give a command—the electronic communication happens automatically. Once the communication has occurred, the devices—whether they're part of a computer system or a stereo—form a network. BLUETOOTH wireless networking systems create a personal-area network (PAN), or piconet, that can fill a room. Once a piconet is established, the members randomly hop frequencies in unison so they stay in touch with one another and avoid other piconets that may be operating in the same area.

The association between mobile device 106 and mobile module 100 comprises a pairing process after which the mobile device and the mobile module can securely communicate with each other. When two devices are paired, the devices are synchronized on one or more respective frequency sequences to receive signals from the other at predetermined clocked time intervals. Paired devices can communicate with each other without interfering with other communication sessions in nearby frequency ranges. For additional privacy and security, encryption can be applied to the data carried in the signals communicated between the devices. Thus, in certain embodiments, when the respective association process is implemented, encryption/decryption keys may be exchanged between the corresponding devices. It should be understood that in addition to, or instead of BLUETOOTH wireless networking, other wireless communication protocols (e.g., IEEE 802.11) may be utilized to establish a communication connection between mobile device 106 and mobile module 100. BLUETOOTH technology, however, provides on-the-fly ad hoc networks at minimum cost in comparison with more expensive wired or wireless alternatives.

Figure 8:
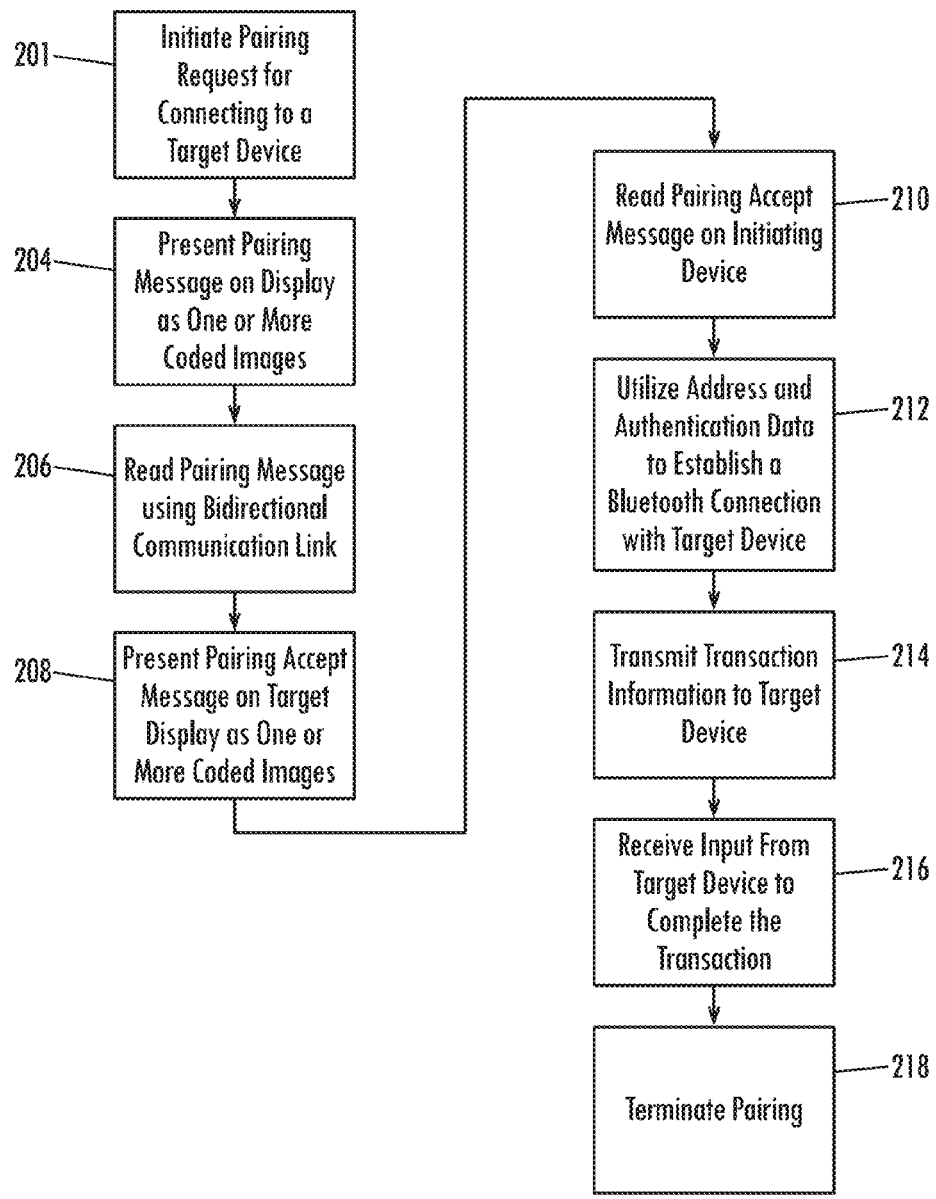
FIG. 8 is an exemplary pairing routine for use with the present invention.

Referring to FIG. 8, in accordance with one embodiment of the invention, at step 201, application software executed on either of mobile module 100 or mobile device 106 initiates a pairing request for connecting to the other device. The pairing request may contain one or more optical images that are projected on one of mobile module display 102 or on the handheld device display. The content of the pairing message may contain the device address associated with the initiating device, a PIN code associated with the device address for inclusion in the pairing message and/or an optional pairing policy indicator, which provides the intended longevity of the pairing process, i.e. a one-time, time-limited, or semi-permanent life span, etc. At step 204, the application software on the mobile device or the mobile module depending on which device initiates the communication, forwards the pairing message comprising at least the device address to the corresponding display where the coded image is displayed. The pairing message may be displayed once for a fixed period of time or it may be displayed repetitively for a fixed number of cycles.

At this point, and referring to FIG. 7, the user positions handheld device 106 into close proximity to mobile module display 102 so that display 102 is within field of view 112 of handheld device camera 110 and the handheld device display is within field of view 104 of mobile module 100. At step 206, the receiving device reads the pairing message over a bi-directional communication link, and the application software on the receiving device decodes and processes the pairing message. At step 208, the receiving device generates an encoded accept message in optical form and displays the accept message on the receiving device's display. The accept message may contain a device address associated with the receiving device and/or a PIN code forwarded by the receiving device for authentication purposes. A public/private key system may be incorporated in the encoded optical message to secure the PIN code and/or the device address information to prevent data theft.

In some embodiments, the application software running on handheld device 106 may provide a user with the option to accept or reject a pairing message submitted by mobile module 100. If the receiving device accepts the pairing request, at step 212, the information contained in the accept optical message is stored in data storage (e.g., ROM, RAM, flash memory, etc.) of the requesting device, and the information is used to establish the wireless connection between the requesting and receiving device. If, instead, the requesting device receives a pairing reject message or no response at all, the requesting device may resubmit another pairing request after a timeout period has expired.

To establish a short-range communication connection, over a BLUETOOTH wireless networking communication protocol, for example, mobile module 100 and handheld device 106 tune their radios to a different frequency, effectively hopping from radio channel to radio channel, which is known as FHSS (Frequency Hopping Spread Spectrum). Thus, if a transmission is compromised by interference on one channel, the retransmission of the data will occur on a different channel Each communication time slot can last approximately 625 microseconds, for example, with a hop rate of approximately 1600 hops/second. Depending on implementation, the requesting device can be assigned as a primary device to set the frequency hopping sequence, and the receiving device can be assigned as the non-primary device to synchronize with the requesting device in time and frequency. In some embodiments, each of devices 100 and 106 are associated with a unique BLUETOOTH wireless networking device address and a 28-bit BLUETOOTH wireless networking clock. In other embodiments, the baseband part of the BLUETOOTH wireless networking system (incorporated in the primary or non-primary device) uses a special algorithm, which calculates the frequency hop sequence based on the primary devices' clock and device address. In addition to controlling the frequency hop sequence, the primary device controls when the non-primary device transmits data using Time Division Multiplexing (TDM).

Once the BLUETOOTH wireless networking connection is established between the requesting device and the receiving device, a transaction can be completed by the user. At step 214, a POS may transmit transaction information using mobile module 100 to handheld device 106. Using application software, in one embodiment, the user may accept the transaction and initiate payment. In other embodiments, application software running on handheld device 106 may allow the user to continue to shop using the handheld device as a user interface with the POS terminal over the BLUETOOTH wireless networking connection. This embodiment would allow multiple users to interact with the POS terminal via a BLUETOOTH wireless networking connection with the mobile module. At step 216, the user completes the transaction and transmits payment information to mobile module 100. Finally, at step 218, once the transaction is completed, the BLUETOOTH wireless networking pairing is terminated.

The present invention seeks to overcome the single shortfall of pairing two devices, i.e. manual input of data to complete the pairing process. That is, the user no longer needs to select a device in a list of devices or manually enter a passkey since device information and key transmission are performed automatically through the optical images transmitted and received by the requesting and receiving devices.

In another embodiment where the mobile module connects with a fuel dispenser/kiosk, the mobile module may be mounted on or in a fuel dispenser and connected to the electronics of the fuel dispenser through the serial or USB ports, wireless or other means of standard communication mediums Once again the mobile module allows for unidirectional or bi-directional communications between the mobile device and dispenser/kiosk, when the mobile device is equipped with an NFC, BLUETOOTH wireless networking, LCD, laser barcode scanner and/or camera. Once the BLUETOOTH wireless networking pairing is established between the dispenser mobile module and the handheld device, the level of information displayed on the handheld device can range from that of current NFC information to a dispenser/kiosk screen being displayed on the handheld display.

In yet another embodiment, the mobile module may be used with legacy fuel dispensers that are already in the field. The mobile module may be mounted to the fuel dispenser and powered by the dispenser electronics. Thus, similar to the embodiment where the mobile module is mounted within the dispenser, transaction information may be transmitted between a customer's handheld device and the dispenser POS terminal via a paired BLUETOOTH wireless networking or other wireless communication connection.

Examples of two-dimensional codes that can be used in the present invention include, a QR Code (two-dimensional bar code) created by Denso-Wave of Japan or a mCode created by Nextcode of Concord, Mass. It should be understood that any form of two dimensional codes may be used in the present invention, where one or more images contain the necessary information to complete the BLUETOOTH wireless networking pairing. As a result, customer information would not have to be provided to store clerks or others working at the store, thereby reducing the likelihood of identity theft and/or stolen payment information. In addition, multiple BLUETOOTH wireless networking pairings may be established between various customer handheld devices and the mobile module so that multiple transactions may be carried out simultaneously to increase the throughput at the station forecourt or the convenience area.

The mobile module may be configured in one of many ways as described herein. For example, the mobile module may be configured to select a transaction methodology based on the capabilities of the customer's handheld device. Moreover, the mobile module may also be configured to complete a transaction based on the payment methodology chosen by the customer. In some embodiments, the transaction may be completed by combining one or more of the data transmission methods. For example, displayed images in combination with data transmitted via BLUETOOTH wireless networking or NFC can be combined to complete a transaction.

While one or more preferred embodiments of the invention are described above, it should be appreciated by those skilled in the art that various modifications and variations can be made in the present invention without departing from the scope and spirit thereof. For example, the stacked display described herein may be used in various transaction terminals such as kiosks, ATM machines, self serve terminals and point-of-sale terminals. It is intended that the present invention cover such modifications and variations as come within the scope and spirit of the appended claims and their equivalents.

What is claimed:

1. A method of connecting a wireless unit to a point-of-sale terminal, the method comprising:
   a. providing a wireless unit having a display and image reader, said display being configured to display a barcode and said image reader being configured to read a barcode;
   b. providing a point-of-sale terminal to wirelessly connect to said wireless unit, said point-of-sale terminal having:
      i. a display configured to display a barcode; and
      ii. an image reader configured to read a barcode;
   c. displaying a first barcode on one of said wireless unit display and said point-of-sale terminal display, said first barcode containing information necessary to pair the wireless unit with the point-of-sale terminal, wherein said information includes an address and a personal identification number associated with said address;
   d. reading said displayed first barcode with said image reader of the other one of said wireless unit and said point-of-sale terminal;
   e. decoding said read first barcode to extract data from said first barcode;
   f. generating a second barcode by said other of said wireless unit and said point-of-sale terminal and displaying said second barcode on said other of said wireless unit and said point-of-sale terminal display; and
   g. wirelessly connecting said wireless unit to said point-of-sale terminal based on said extracted data.

2. The method of connecting a wireless unit to a point-of-sale terminal of claim 1, wherein said first barcode is displayed for a fixed period of time.

3. The method of connecting a wireless unit to a point-of-sale terminal of claim 1, wherein said wireless unit is a cell phone.

4. The method of connecting a wireless unit to a point-of-sale terminal of claim 1, further comprising the step of decoding said second barcode and storing said decoded data in a memory storage of said one of said wireless unit and said point-of-sale terminal.

5. The method of connecting a wireless unit to a point-of-sale terminal of claim 4, wherein said second barcode contains data representative of at least one of said other of said wireless unit and said point-of-sale terminal address and personal identification number.

6. A method of connecting a wireless unit to a point-of-sale terminal, the method comprising:

a. providing a wireless unit having a display and image reader, said display being configured to display a barcode and said image reader being configured to read a barcode;
b. providing a point-of-sale terminal to wirelessly connect to said wireless unit, said point-of-sale terminal having:
  i. a display configured to display a barcode; and
  ii. an image reader configured to read a barcode;
c. displaying a first barcode on one of said wireless unit display and said point-of-sale terminal display, said first barcode containing information necessary to pair the wireless unit with the point-of-sale terminal;
d. reading said displayed first barcode with said image reader of the other one of said wireless unit and said point-of-sale terminal;
e. decoding said read first barcode to extract data from said first barcode; and
f. wirelessly connecting said wireless unit to said point-of-sale terminal based on said extracted data,
wherein said wireless unit display and image reader are integrated in a single bi-directional screen capable of displaying and receiving optical images.

7. A method of connecting a wireless unit to a point-of-sale terminal, the method comprising:
a. providing a wireless unit having a display and image reader;
b. providing a fuel dispenser point-of-sale terminal to wirelessly connect to said wireless unit, said point-of-sale terminal having a display and an image reader;
c. displaying a first barcode on one of said wireless unit display and said point-of-sale terminal, said first barcode containing information necessary to pair the wireless unit with the point-of-sale terminal;
d. reading said displayed first barcode with said image reader of the other of said wireless unit and said point-of-sale terminal;
e. displaying a second barcode on said other of said wireless unit and said point-of-sale terminal in response to said first barcode;
f. reading said displayed second barcode with said image reader of said one of said wireless unit and said point-of-sale terminal; and
g. wirelessly pairing said wireless unit to said point-of-sale terminal based on said first and said second barcode data.

8. The method of connecting a wireless unit to a point-of-sale terminal of claim 7, wherein said first barcode contains an address and a personal identification number of said one of said wireless unit and said point-of-sale terminal.

9. The method of connecting a wireless unit to a point-of-sale terminal of claim 7, wherein said second barcode contains an address and personal identification number of said other of said wireless unit and said point-of-sale terminal.

10. The method of connecting a wireless unit to a point-of-sale terminal of claim 7, wherein said first barcode further comprises a public/private key system to prevent data theft.

11. The method of connecting a wireless unit to a point-of-sale terminal of claim 7, wherein said wireless unit is a cell phone.

* * * * *